United States Patent [19]
Nakajima et al.

[11] Patent Number: 6,085,225
[45] Date of Patent: Jul. 4, 2000

[54] INFORMATION TRANSMISSION SYSTEM, INFORMATION STORING AND PROVIDING APPARATUS, AND INFORMATION RECEIVING APPARATUS

[75] Inventors: Tatsuyoshi Nakajima; Naoya Hashimoto, both of Tokyo, Japan

[73] Assignee: Oki Electric Industry Co. Ltd., Tokyo, Japan

[21] Appl. No.: 08/917,755

[22] Filed: Aug. 27, 1997

[30] Foreign Application Priority Data

Aug. 28, 1996 [JP] Japan .................................. 8-226624

[51] Int. Cl.[7] .................................................. G06F 13/00
[52] U.S. Cl. .......................... 709/203; 709/206; 709/219; 709/223
[58] Field of Search .................................. 709/203, 206, 709/243, 231, 244; 707/104

[56] References Cited

U.S. PATENT DOCUMENTS

| | | | |
|---|---|---|---|
| 4,748,620 | 5/1988 | Adelmann et al. ..................... | 370/394 |
| 5,321,750 | 6/1994 | Nadan ........................................ | 380/20 |
| 5,404,505 | 4/1995 | Levinson .................................... | 707/10 |
| 5,491,820 | 2/1996 | Belove et al. ........................... | 395/600 |
| 5,706,435 | 1/1998 | Barbara et al. ......................... | 711/141 |
| 5,829,001 | 10/1998 | Li et al. .................................... | 707/10 |
| 5,850,522 | 12/1998 | Wlaschin ................................. | 709/215 |
| 5,862,331 | 1/1999 | Herriot ................................. | 395/200.49 |
| 5,862,346 | 1/1999 | Kley et al. ............................... | 709/245 |
| 5,870,765 | 2/1999 | Bauer et al. .............................. | 707/203 |
| 5,884,324 | 3/1999 | Cheng et al. ........................... | 707/201 |

*Primary Examiner*—Glenton B. Burgess
*Assistant Examiner*—Abdullahi E. Salad
*Attorney, Agent, or Firm*—Rabin & Champagne, P.C.

[57] ABSTRACT

An information transmission system is capable of efficiently and smoothly transmitting and receiving supply information among an information storing and providing apparatus and a plurality of information receipt apparatus. The information storing and providing apparatus includes means for broadcasting at least one of category information, contract information, and time information concerning the supply information, and a plurality of information apparatuses each include means for determining whether the supply information is necessary, available, and the up-to-date, referring thereto.

12 Claims, 9 Drawing Sheets

Fig. 7(a)

| SERVER CATEGORY | GENRE CATEGORY | INFORMATION CATEGORY | DETAILED CATEGORY | CATEGORY ID | C R C |

Fig. 7(b)

| INFORMATION REQUEST | CATEGORY ID | C R C |

Fig. 7(c)

| CATEGORY ID | CODING KEY | C R C |

Fig. 7(d)

| CODING-KEY RECEPTION-ANSWER | CATEGORY ID | C R C |

Fig. 7(e)

| CATEGORY ID | TIME INFORMATION | TRANSMISSION INFORMATION BODY (DECODING PROCESS IS FINISHED) | C R C |

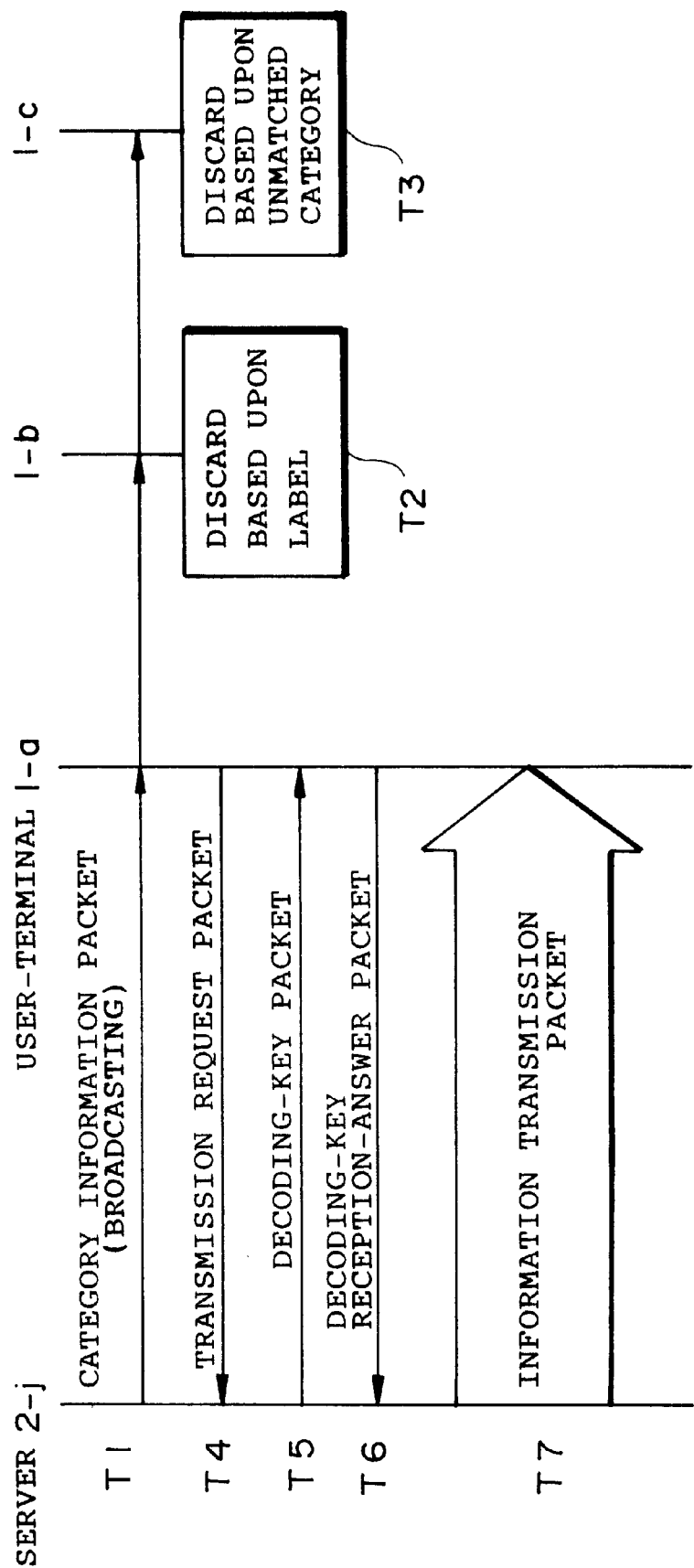

INFORMATION TRANSMISSION SYSTEM, INFORMATION STORING AND PROVIDING APPARATUS, AND INFORMATION RECEIVING APPARATUS

BACKGROUND OF THE INVENTION

The present invention relates to an information transmission system in which an information storing and supplying apparatus supplies information to an information receiving apparatus via a network.

There have been many information transmission systems, in which users retrieve information stored in an information storing and supplying apparatus (hereinafter, referred to as "a server") using an information receiving apparatus (hereinafter, referred to as "a user terminal") via a network, for example, the Internet.

For information transmission services using the Internet, at first, a user accesses a server that stores data required by the user and requests that the server send main data (Home Page). By the access, the server identifies the user to send the main data. Upon receiving the main data from the server, if necessary, the user chooses detailed data in reference to a list in the main data and requests that the server supply the detailed data to the user. In response to the request, the server supplies the user with the requested detailed data. This allows data transmission services to be rendered over the Internet. Similarly, in information transmission systems in other networks for specific purposes or general purposes, other than the Internet, servers have supplied users with information in response to the users'requests.

In above conventional information transmission systems, the user can receive only information that has already been stored by the time of the accessing. Consequently, the user cannot capture any later updating of the received information.

For example, some information suppliers, or some servers, frequently update their information on on-the-spot broadcasted baseball games and on odds of horse races, if there are any changes. Accordingly, the conventional information systems burden users who require updated information, with necessary frequent accesses to their servers. However, the information is not always updated. As a result, their repetitive accesses sometimes lead to vain efforts. In view of the amount of traffic amount over the network, such useless accesses hinder an efficient information transmission system. In particular, for information transmission systems that accommodate many users'terminals, frequent accesses might cause congestion and so forth.

There has been another method of capturing updated information, which is employed in the text broadcasting system: servers continually supply up-to-date information over network while users intercept information that seems necessary to the users. Pursuant to the method, however, the users might take much information that is unnecessary to the users, which only permits the users to obtain little information that is necessary to the users. Because much information is supplied in spite of little information that is necessary to the users, the method proves not to be an efficient information transmission system.

Furthermore, information has always involved revision numbers and update time, which are available only as the revision numbers and update time are available themselves.

If a clock in a user's terminal is incorrect despite an exact update time, the terminal that intends to implement some processes based on the update time, might experience trouble as follows: assuming that the terminal is designed to discard any information, including update time, that seems to lie in the future in terms of its clock, the incorrect clock possibly causes the terminal to discard all information provided by servers.

Moreover, the amount of supplied information is often large. In this case, the information should be divided into many pieces. However, such pieces possibly reach the user in an order different from an original order, depending on network condition. With packet communication, the order of the received pieces is confirmed in reference to the sequence numbers of packets. If the order differs from the original order, the pieces may not reproduce the information, this is, the above confirmation does not compensate for such a disorder.

SUMMARY OF THE INVENTION

Therefore, the object of the present invention is to provide an information transmission system, information storing and providing apparatus, and information receipt apparatus capable of efficiently or smoothly transmitting and receiving information to be supplied (supply information), based upon correct time thereover and independently from disorder of a series of information.

According to one aspect of the present invention, the information transmission system for use with a network includes an information storing and providing apparatus for providing supply information and a plurality of information receipt apparatuses for receiving the supply information, wherein the information storing and providing apparatus comprises means for generating first category information denoting a category of the supply information; and means for broadcasting the category information via the network, and the plurality of the information apparatuses each comprise means for storing second category information with respect to supply information necessary therefor; means for receiving the first category information; means for comparing the first category information with the second category information to determine whether or not the supply information from the information storing and providing apparatus is necessary; and means for presenting the supply information from the information storing and providing apparatus upon determination that the supply information is necessary.

According to another aspect of the present invention, the information transmission system for use with a network includes an information storing and providing apparatus for providing supply information and a plurality of information receipt apparatuses for receiving the supply information, wherein the information storing and providing apparatus comprises means for generating contract information denoting a charge for the supply information, and means for broadcasting the contract information via the network, and the plurality of information apparatuses each comprise means for receiving the contract information; means for determining, based upon the contract information, whether the supply information corresponding to the contract information is presentable; and means for presenting the supply information upon determination that the supply information is presentable.

According to another further aspect of the present invention, the information transmission system for use with a network includes an information storing and providing apparatus for providing supply information and a plurality of information receipt apparatuses for receiving the supply information, wherein the information storing and providing apparatus comprises means for updating the supply information; means for generating time information with respect to updating of the supply information; and means for broadcasting the time information via the network, and the plurality of information apparatuses each comprise means for receiving the time information; means for determining whether the supply information is the most recent; and means for presenting the supply information upon determination that the supply information is the most recent.

BRIEF DESCRIPTION OF THE DRAWINGS

FIGS. 7(a)–(e) are diagrams showing the formats of information transmission packets of the second embodiment;

FIG. 9 is a time sequence showing the operation of the information transmission system of the second embodiment.

DESCRIPTION OF THE PREFERRED EMBODIMENTS

First Embodiment

An information transmission system of a first embodiment according to the present invention will be described in detail with reference to the accompanying drawings.

The information transmission system of the first embodiment features a real-time information transmission service operation, wherein upon updating information, a server broadcasts the updated information and category information over a network, while user terminals capture the category information and screen the updated information in reference to the category information to receive only the updated information necessary to the users among the quantity of updated information.

Figure 2:
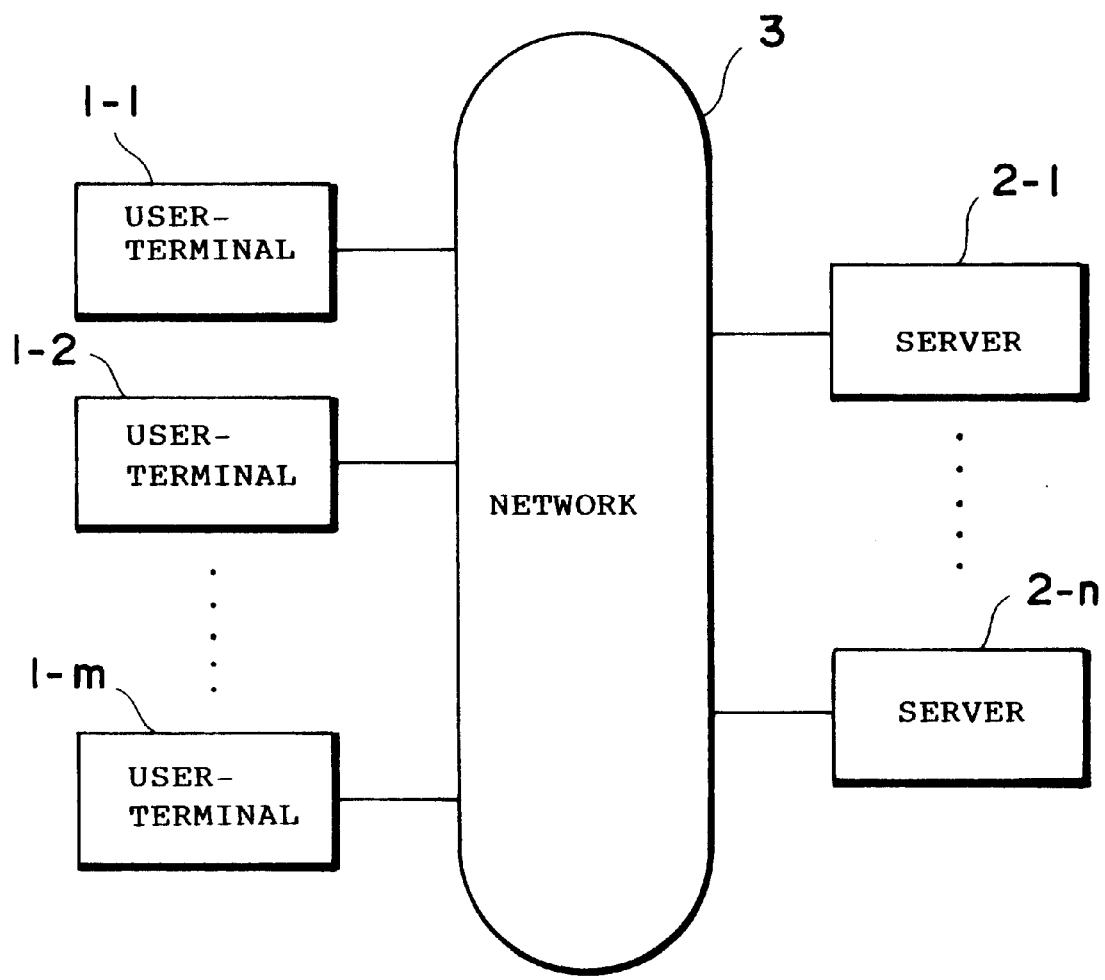
FIG. 2 is a block diagram showing the network configuration of the information transmission system.

FIG. 2 shows a network configuration of the information transmission system of the first embodiment. In the figure, the information transmission system comprises several user terminals (information receiving apparatuses) 1-1~1-m, which receive information, and a server (information storing and supplying apparatus) or servers 2-1~2-n, which supplies information, all of which are connected via a network 3.

The network 3 must permit a broadcasting function for the purpose of the present invention. However, it can be either a private network or a public network. Furthermore it can be bus-shaped, ring-shaped, or mesh-shaped in topology, and may include a concentrating station or a repeater station, depending on its topology.

Each of the servers 2-1 to 2-n is constructed of a super computer or a workstation, which includes a hard disk apparatus with large capacity, and a communication apparatus like a modem and an Ethernet interface unit.

Figure 1:
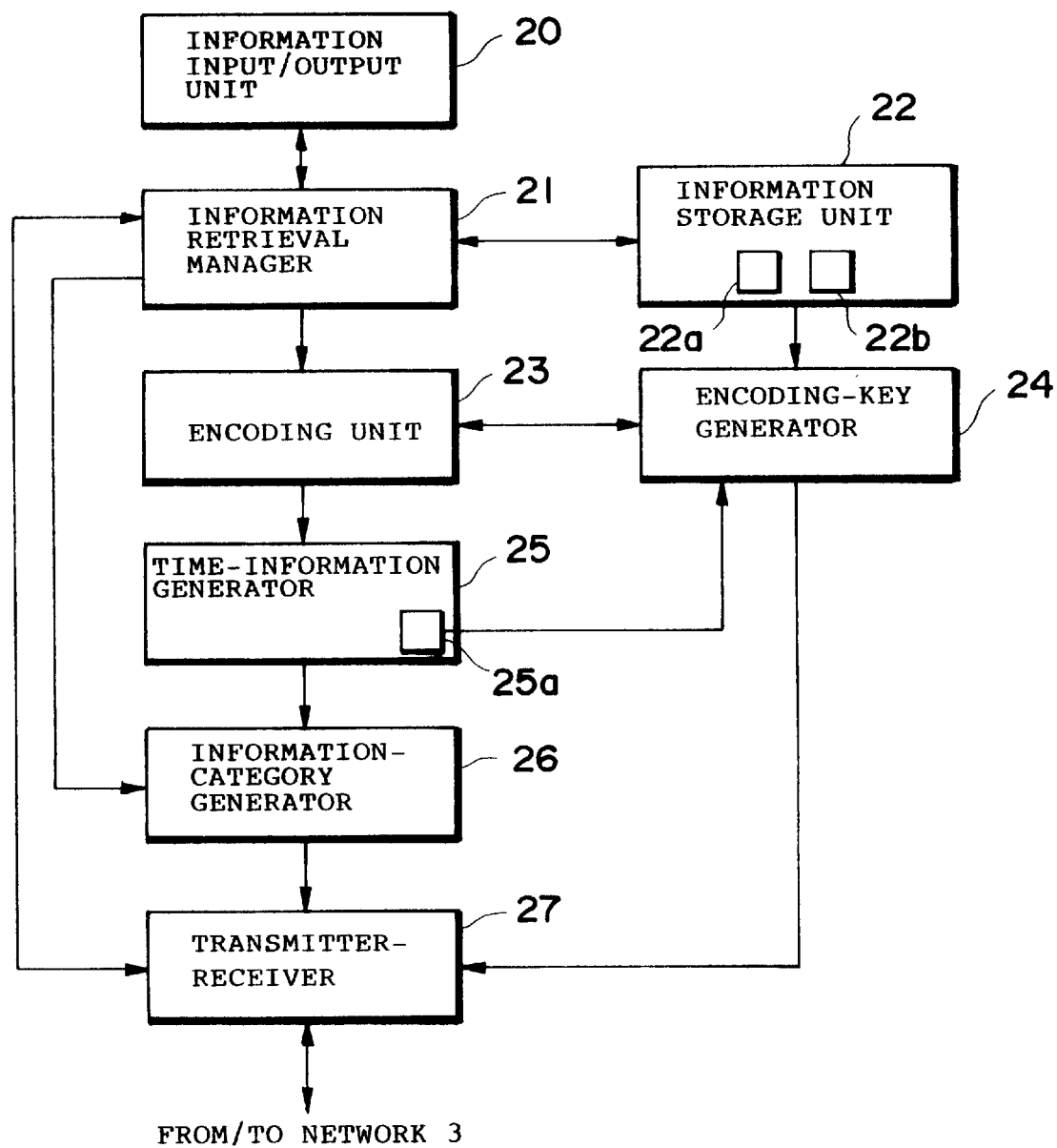
FIG. 1 is a functional block diagram showing the server in the information transmission system of the first embodiment.

FIG. 1 shows the operational configuration of the server. Each server 2-j (j: 1 to n) is made up of information input/output unit 20, information retrieval manager 21, information storage unit 22, coding unit 23, coding key generator 24, time-information generator 25, information-category generator 26 and server transmitter-receiver 27.

Information input/output unit 20 receives new or updated supply information, and new or updated information on contract-holders who are permitted to present the information supplied by the information transmission system. Moreover, information input/output provides supply information received from the information retrieval manager 21, upon receipt of a request of confirming updated information and charging information from a user terminal.

The supply information (shown in FIG. 3(a)) contains category information (shown in FIG. 3(b)) that indicates the property of the information. The category information has genre category and information category (shown in FIG. 3(d)). The genre information denotes a large classification while the information category denotes small classification and fine classification. For example, in respect of baseball games, the large classification is given a title 'sports', the small classification is given a title 'baseball', and fine classification is given a title 'team name'.

The information on the contract-holders contains information for specifying a contract-holder and a terminal ID of a contract-holder, information for specifying the genre category and the information category of supply information that users are permitted to present, and also information on the term of the contract and the running time of the service.

Information storage unit 22 comprises storage unit 22a and storage unit 22b. Storage unit 22a stores the supply information in such a manner that the information is assessable using keys such as the genre category and the information category. Storage unit 22b stores information on the contract-holders in such a fashion that the information is assessable using keys such as the genre category and the information category, and also charging information for each contract-holder.

Information retrieval manager 21 updates information on the contract-holders stored in the storage unit 22b upon receiving instructions, including information on an entry of a new contract-holder, which command it to change the information in the storage unit 22b.

Moreover, upon receiving new supply information and updated supply information from information input/output unit 20, information retrieval manage 21 updates supply information stored in storage unit 22a and prepares for transmission of the received supply information. At the start of transmission, the information retrieval manager 21 also updates charging information stored in storage unit 22 corresponding to the received supply information.

Among Server 2-j and user terminal 1-I (I: 1 to m) in network 3 are transmitted and received the packets, for example, in ATM communication, as shown in FIG. 3(a), wherein information retrieval manager 21 divides the supply information into a plurality of information pieces corresponding the packets (hereinafter, referred to as "transmission-unit information": shown as transmission information body in FIG. 3(b)), thus preparing for transmitting them to coding unit 23.

Here, information to transmit to user terminal 1-i can be the entire information received from information input/output unit 20, or the updated portion of the information. The first time supply information is received, the entire information is transmitted. On the contrary, in the case of receiving updated information, the amount of the information is compared with a first threshold. If smaller, the entire information is transmitted. If larger, the received information is calculated as a difference between the information and the information stored previously in information storage unit 22 which has not been updated yet, and also the difference is compared with a second threshold. If larger, the entire received inputted information is transmitted. If smaller, only the difference is transmitted with information denoting there lies the difference.

Incidentally, upon receiving a receipt response of a decoding key from user terminal 1-$i$ via server transmitter-receiver 27, information retrieval manager 21 assumes information on the contract-holders in storage unit 22$b$ to be valid. Otherwise, information retrieval manager 21 assumes information on contract-holders to be invalid, while not erasing information in order to avoid any troubles with charging.

Coding unit 23 codes a transmission unit of information received from information retrieval manager 21, using the coding key corresponding to the supply information that is generated at decoding key generator 24, thereby transmitting it to time-information generator 25. Here, a coding key is transmitted to user terminal 1-$i$ in order to serve as a decoding key; the purpose of such a coding procedure is to permit true contract-holders to present supply information. Any coding approaches will favor the present invention; however, the particular coding procedure is not important.

Encoding key generator 24, using random numbers etc., repetitively generates a coding key every predetermined time (e.g., one month, one week, or one day), such as a contract minimal period, and stores it. Further, encoding key generator 24 transmits it to user terminal 1-$i$ in order to permit it to serve as a decoding key. Thus, the coding key and the decoding key are the same. In this way, the contract between an information supplier and an information receiver is renewed, whereby the information receiver is permitted to present information supplied by the information supplier, using the decoding key.

Here, coding keys are generated so as to be different in accordance with contents of contracts, such as genre category and an information category, more specifically in accordance with minimal contract unit. Moreover, transmission of coding keys is processed in such a way that information on a contract-holder of minimal contract unit in terms of the coding key is taken storage unit 22$b$ to be successively transmitted to each contract-holder (user terminal 1-$i$). When a coding key is transmitted, information (e.g., identification number) on genre category and information category is also transmitted with the coding key.

In addition, supply information is broadcast, which differs from the transmission of coding keys (decoding keys). Furthermore, coding keys (decoding keys) may be broadcast on network 3, if network 3 is a confidential or closed system oriented to servicing information transmission.

In response to a request from encoding unit 23, coding key generator 24 transmits to encoding unit 23 a coding key corresponding to the request.

Time-information generator 25 is embedded with a clock 25$a$, for example, a standard electric-wave clock. When a transmission unit of coded information is entered, time-information generator 25 extracts a current real time from clock 25$a$, and processes the extracted current real time into the form that can be inserted into a packet, and adds it to a transmission unit of coded information, and transmits them to information category generator 26.

FIG. 3(C) shows an illustrative format of time information that will be inserted into a packet, where a bit count for each section is put in parentheses. As is shown in FIG. 3(C), time information comprises at least 'date' (5 bits), 'hour' (5 bits), 'minute' (6 bits), 'second' (6 bits), 'millisecond' (10 bits), 'microsecond' (10 bits), 'Cyclic Redundancy Check (CRC)' ($\alpha$ bits). Other information ($\beta$ bits) can include 'month' and 'bits showing whether time-information varies or not'.

Here, 'the bits showing whether time-information varies or not' shows which of inserting time-information different from each other into each packet constituting certain supply information and inserting time-information identical with each other thereinto, are selected according to a sort of supply information or an amount thereof. Basically, in the first embodiment, time-information different from each other for each packet is inserted.

The following functions are involved in time-information transmission. Based on time-information, a contract-holder distinguishes between the latest information and old information. That is, once supply information is updated in server 2-$j$, user terminal 1-$i$ can receive the updated information. A contract-holder, however, does not always see the updated information. When seeing it, the contract-holder can judge whether or not it is the up-to-date information, using time-information, not version. Moreover, user terminal 1-$i$ can make the clock accurate in reference to the time-information, though some propagation delay exists. Further, for transmission of time-information different from each other for each packet, user terminal 1-$i$ judges the order of packets in reference to the time information, as well as judges it in reference to the sequence number of each packet, thereby accomplishing a double check.

Besides, time of clock 25$a$ is provided to coding key generator 24, which catches a generation timing of coding keys with reference to the time.

Information category generator 26 prepares information to be inserted to the information section of a packet, by attaching category information indicating categories on the supply information given by time-information generator 25 thereto, thus transmitting the prepared information to server transmitter-receiver 27.

Figure 3:
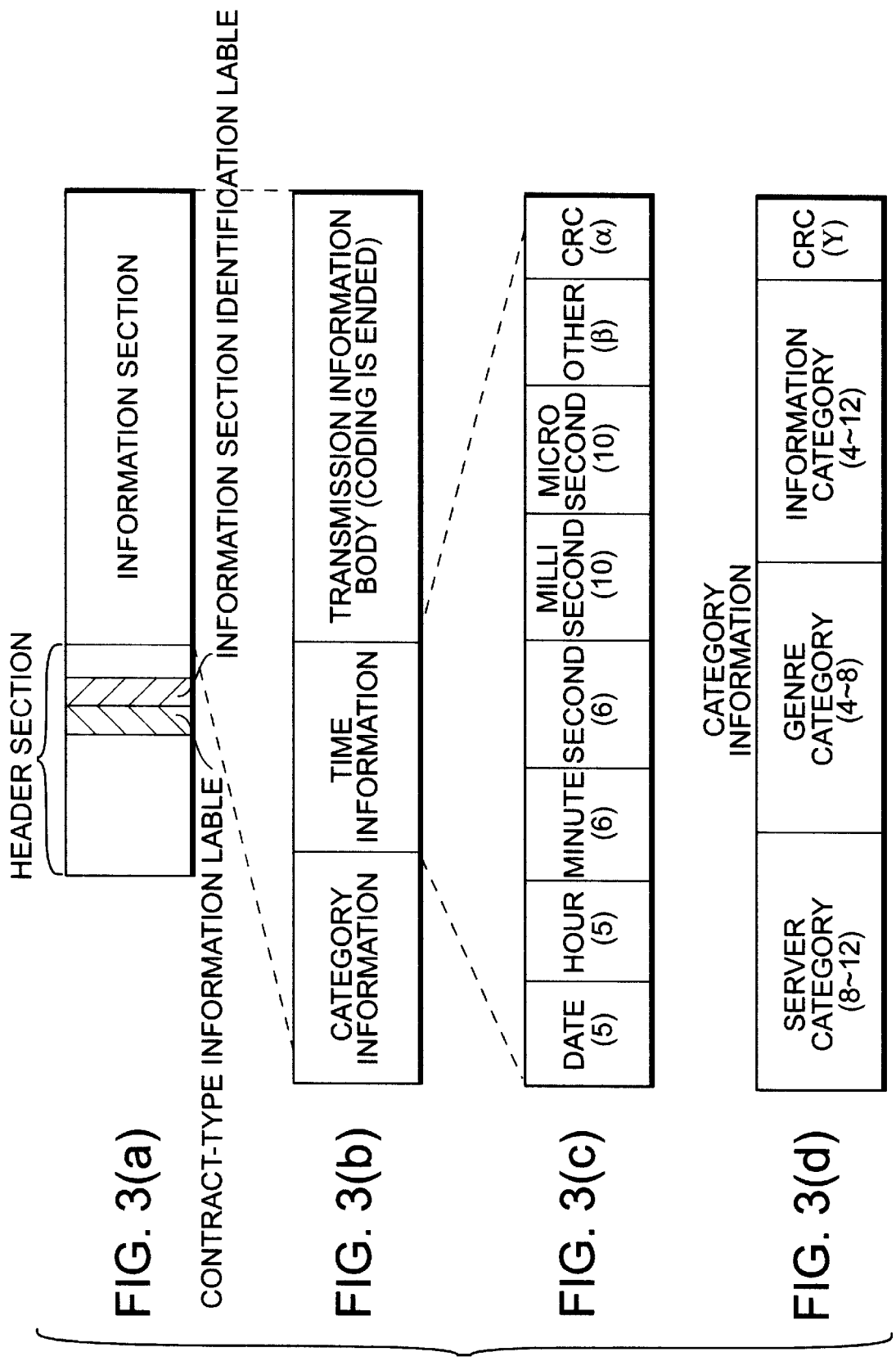
FIGS. 3(a)–(d) are diagrams showing the formats of information transmission packets of the first embodiment.

Here, the category information, as is shown in FIG. 3($d$), is made up of 'server category' (one of 8 through 12 bits), which comprises identification numbers specifying server 2-$j$, 'genre category' (one of 4 through 12 bits) as described above, 'information category' (one of 4 through 12 bits) as described above, and 'cyclic redundancy check (CRC)' ($\gamma$ bits). Furthermore, the genre category and information category are taken out of storage unit 22$a$ by information retrieval manager 21, and provided to information category generator 26. Moreover, the server category may include information specifying a transmission-service supplying company.

This category information is used for determining (screening) whether or not supply information is useful or important for user terminal 1-$i$.

Upon receiving information concerning a contract-holder or a user terminal and a decoding key (coding key) from coding key generator 24, transmitter-receiver 27 inserts the decoding key into the information section and prepares a decoding key notification packet, in which the information concerning the contract-holder or the user terminal is inserted into an address field of the header section, thus transmitting it to network 3.

Upon receipt of a receipt-answer packet for a decoding key from user terminal 1-$i$ via network 3, server transmitter-receiver 27 notifies information retrieval manager 21 of the receipt.

Moreover, upon receiving supply information from information category generator 26, server transmitter-receiver 27 inserts the information into the information section of a packet, and also completes an information transmission packet by attaching the header section including information which denotes broadcast communication, thereby transmitting it to network 3.

Here, a contract-type information label, which indicates the packet for a contract-holder (hereinafter, referred to as "contract-type information packet"), is inserted in the header section of all kinds of packets transmitted from server 2-$j$. The contract-type information label is used for making a distinction between the contract-type information packet and other packets. The information section distinction label, which indicates whether the content of the information section is supply information or a coding key, is inserted in the header section in a packet transmitted from server 2-$j$. The information section distinction label is used for making a distinction between a packet of supply information or a coding key notification packet at user terminal 1-$i$. Since there are undefined bits, with usage that is not yet determined, in conventional packet formats, the undefined bits, for example, can be used for such a label.

Figure 4:
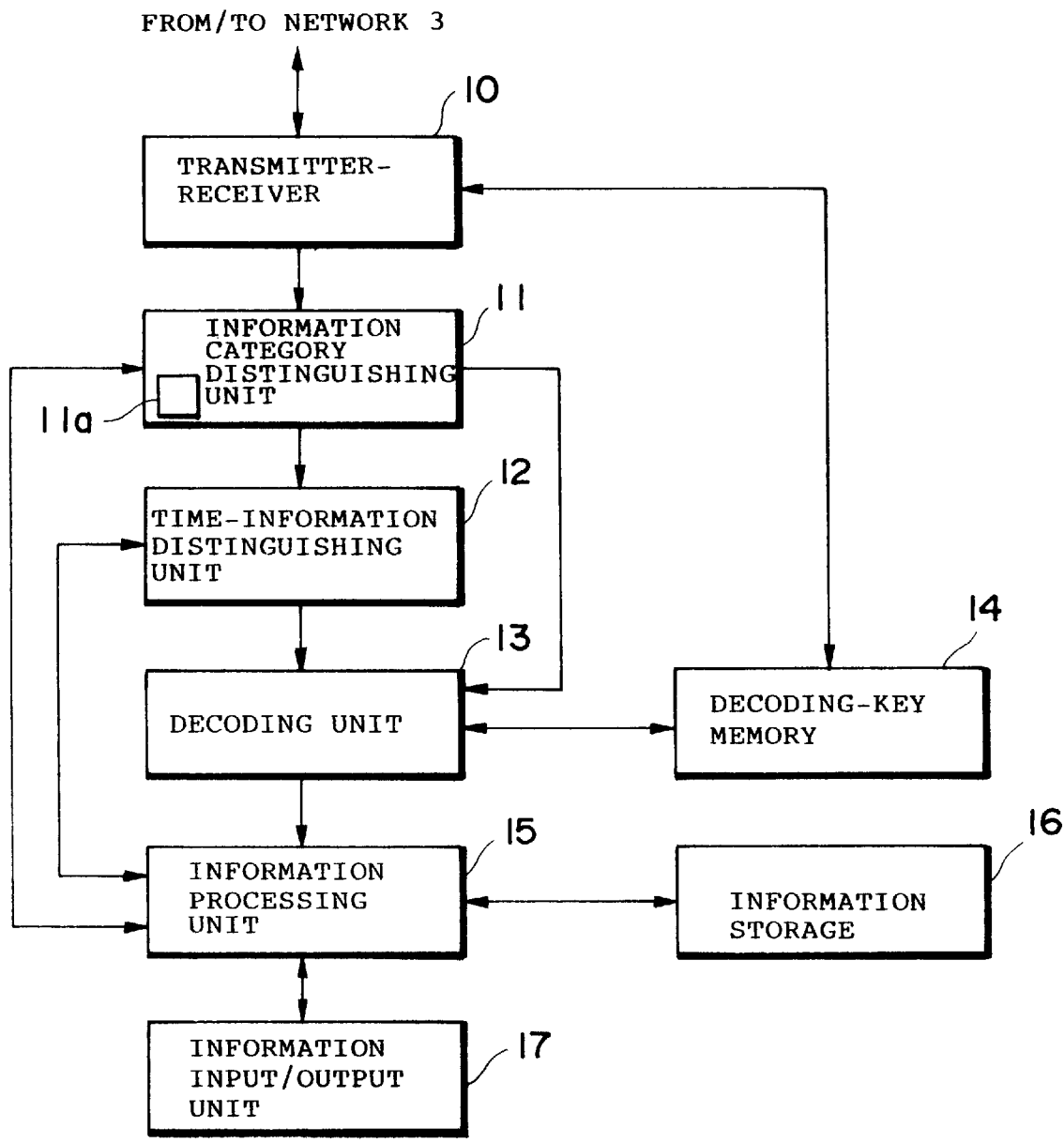
FIG. 4 is a functional block diagram showing the configuration of the user terminal in information transmission system of the first embodiment.

Each user terminal 1-$i$ is made up of, for example, a hard-disk, a workstation, which comprises a communication apparatus like a modem and an Ethernet interface unit, and a personal computer. Its configuration is shown in FIG. 4, which also serves as functional block diagram.

Each user terminal 1-$i$ comprises terminal transmitter-receiver 10, information category distinguishing unit 11, time-information distinguishing unit 12, decoding unit 13, decoding key memory 14, information processing unit 15, information storage 16, and information input/output unit 17. To inhibit unauthorized retrieval of supply information to supply, preferably, terminal transmitter-receiver 10, information category distinguishing unit 11, time-information distinguishing unit 12, decoding unit 13 and decoding key memory 14 are realized as an external apparatus of the information processing unit like a workstation and a personal computer, or a dedicated peripheral apparatus (adapter) for supplying information transmission service.

Terminal transmitter-receiver 10 performs packet-transmitting/receiving with server 2-$j$ via network 3. A receipt packet is used for interpreting a packet header section while a transmission packet is used for generating a packet header section.

Terminal transmitter-receiver 10 determines the contract-type information label of a receipt packet. When the label indicates a packet other than the contract-type information packet used for identifying an information transmission service, the packet is either transmitted to a packet processing unit (not shown), or discarded if no packet processing is available. When the label indicates the contract-type information packet, whether it is a packet of supply information or a decoding key notification packet is determined according to the information unit distinction label.

If it is a packet of supply information, the content of the information unit of the packet is transmitted to information category distinguishing unit 11. If it is a decoding key notification packet, the content (decoding key, genre category, and information category) of the information unit is transmitted to decoding key memory 14. Further, since, in the decoding key notification packet, the identification number of user terminal 1-$i$ is inserted into the address field regardless of broadcast communication, packet distinction can be made according to this fact. In addition, if it is a packet of supply information, the packet sequence number in the header section is determined, and packet order is adjusted, and then the packet is provided to information category distinguishing unit 11.

Upon receiving a request for transmitting an answer in return for the receipt of a decoding key to server 2-$j$, terminal transmitter-receiver 10 transmits a receipt-answer packet for the decoding key to server 2-$j$ of the transmission source of the decoding key.

When receiving a decoding key, a genre category, and a information category from terminal transmitter-receiver 10, decoding key memory 14 commands terminal transmitter-receiver 10 to transmit the receipt-answer of the decoding key to server 2-$j$, after storing the decoding key in forms corresponding to the genre category and information category.

As described above, since server 2-$j$ transmits a decoding key only to user terminal 1-$i$ relevant to a contract, decoding key memory 14 does not need to determine whether user terminal 1-$i$ should receive the received decoding key. However, from the viewpoint of safety, decoding key memory 14 should store the key in itself, after comparing the contracted genre category and information category stored in information storage 16 with the genre category and information category of the received decoding key. Also, decoding key memory 14 returns the decoding key in response to request of a decoding key from decoding unit 13.

Information category distinguishing unit 11 embeds category information storage 11$a$ which stores category information such as server category, genre category, category information pursuant to the contents of contract, wherein based on the category information, user terminal 1-$i$ is permitted to receive supply information.

When receiving the content of the packet information section from terminal transmitting-receiving unit 10, information category distinguishing unit 11 determines whether the content stored in category information storage 11$a$ is a category of supply information that user terminal 1-$i$ is permitted to receive, which is executed through distinguishing (error detection and error correction based upon CRC) the content of the category information field, namely, a server category, genre category, and information category shown in FIG. 3($d$). This determines whether the category information matches the contract. When distinguished category information matches the contract, the content of the packet information section is transmitted to time-information distinguishing unit 12. Meanwhile, when distinguished category information does not match the contract, information category distinguishing unit 11 discards the packet. As described above, packets are screened on the basis of the category information.

The reason for employing the coding and decoding process is to prevent an unauthorized contract-holder from improperly taking supply information through manipulation of a screening operation in information category distinguishing unit 11.

Upon receipt of information processed by information category distinguishing unit 11, time-information distinguishing unit 12 distinguishes (e.g., through error detection and error-correction) the content of the time-information field as shown in FIG. 3(C), and compares the time of the information with the time of the information having the same category that has received and stored previously in information storage 16, thus confirming that the processed information is newer.

As described above, server 2-$j$ transmits supply information when the information is updated or is newly received. Accordingly, if older information followed newer information, which might occur due to the condition of network 3, time-information distinguishing unit 12 would discard an older packet which arrived thereat after arrival of a newer packet.

Time-information distinguishing unit 12 provides time information to information processing unit 15, and allows the time of the clock in user terminal 1-*i* to be adjusted, upon recognition of proper time information. For a series of information transmission packets into which different time information is inserted for each packet, time-information distinguishing unit 12 checks an order of the series of packets that have arrived at user terminal 1-*i*. If wrong, the series of packets is rearranged. On completion of the above processes, time-information distinguishing unit 12 provides the content (at least, transmission information body) of the packet information section to decoding unit 13.

When receiving the content of the packet information unit from time-information distinguishing unit 12, decoding unit 13 derives a decoding key corresponding to the category of the supply information from decoding key memory 14, and decodes the transmission information body, which has been coded as shown in FIG. 3(*b*), thus the decoded supply information is given to information processing unit 15.

Information storage 16 stores supply information having server category, a genre category, and information category along with the time information.

Information processing unit 15 receives from information input/output unit 17, information category, more precisely, a server category, a genre category, and information category pursuant to contents of the contract, which regulates the condition of user terminal's 1-*i* receipt, and also gives them to category information storage unit 11*a*, thereby allowing storage of them.

Besides, information processing unit 15 provides to time-information distinguishing unit 12, time information with respect to immediately preceding transmission that was retrieved from information storage 16.

Also, upon receiving decoded supply information to supply from decoding unit 13, information processing unit 15 stores into information storage 16, the information and the time information that was provided by time-information distinguishing unit 12. Accordingly, on completion of storing a series of supply information, the information processing unit 15 notifies that updated information or newly received information exists in information input/output unit 17. For time information stored in information storage unit 16, time information inserted in the forefront information transmission packet disposed in the series of information transmission packets may be available, and also time information inserted in the forefront or the last information transmission packet disposed in the series of information transmission packets may be available.

Moreover, in response to a request for retrieving supply information, with a server category, genre category, and information category being specified by information input/output unit 17, information processing unit 15 retrieves corresponding supply information corresponding thereto from information storage 16, thereby giving it to information input/output unit 17.

Information input/output unit 17 serving as a user interface receives category information concerning contract, such as a server category, a genre category, and information category, and notifies the existence of newly received supply information. Furthermore, information input/output unit 17 requires information processing unit 15 to retrieve supply information with a server category, a genre category, and information category being specified, thus displaying returned supply information.

Hereinafter, a first information transmission system will be described, which comprises user terminal 1-*i* and server 2-*j* as described above.

Figure 5:
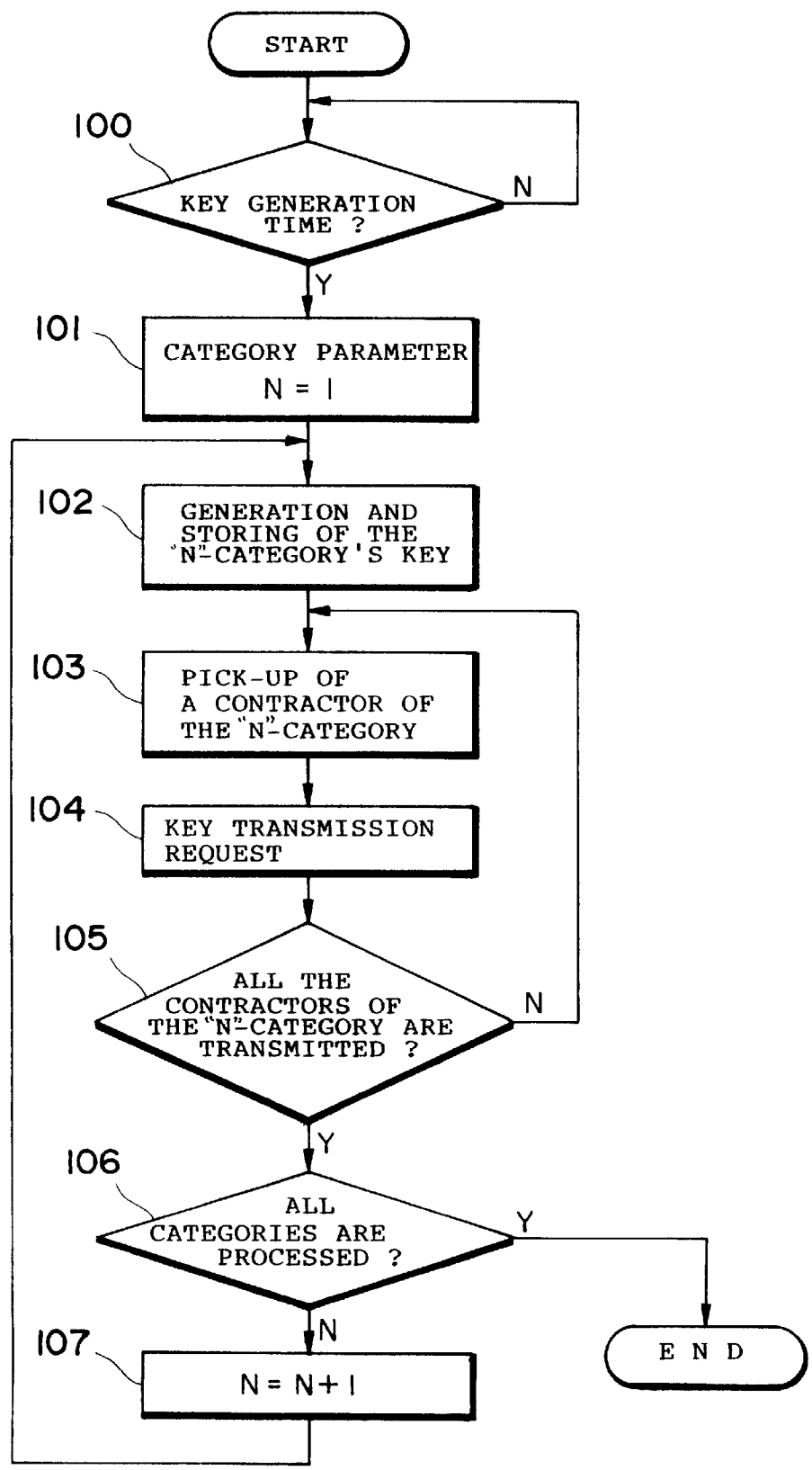
FIG. 5 is a flowchart showing a process of generating the encoding key of the first embodiment.

At first, the information transmission system generates a coding key, which is delivered to user terminal, or contract-holder. This operation will be described in terms of operation of coding key generator 24, with reference to FIG. 5 showing a flowchart of the operation thereof.

Coding key generator 24 waits until the time for generation of a key is reached (step 100). At the time for generation of a key, category parameter N, which specifies a category of a contract minimal unit, is initialized (step 101). After that, an N-category key is generated using random numbers, and is stored (step 102). Next, one contract-holder or user terminal of the N-category is selected through contract-holder information storage unit 22*b* (step 103). Further, coding key generator 24 requests server transmitter-receiver 27 to send the decoding key (including category information) to the contract-holder (step 104).

Accordingly, the decoding key is transmitted to the user terminal 1-*i*, and stored in decoding key memory 14. Then, a receipt-answer is sent back to decoding key memory 14, which leads to completion of entering into a contract.

Coding key generator 24 confirms delivery of transmission requests to all the contract-holders of the N-category after the transmission request of the decoding key (step 105). If not delivered, the process goes back to step 103, wherein a contract-holder is selected as described above. If delivered, a determination of whether the generation process of a coding key for all categories is finished, is made (step 106).

If the process for all categories is not completed yet, the category parameter is updated into that of designating a next category, and the process goes back to coding key generation step 102 as described above (step 107). If completed, the processing series is finished.

Next, for first transmission of supply information and transmission of updated supply information, the operations of server 2-*j* and then user terminal 1-*i* will be described in this order with reference to FIG. 1 and FIG. 4, which also depict flows of the operations.

When supply information or newly updated supply information is received by information input/output unit 20, information retrieval manager 21 updates the content of transmission object information storage unit 22*a* and initiates the transmission process for the received supply information. At this time, charging information for a contract-holder corresponding to the supply information is updated.

Here, on the basis of the amount of received supply information or the amount of not updated supply information, information retrieval manager 21 determines to transmit the entire received supply information or to transmit portions thereof, more specifically, portions representing the difference between the updated information and the not updated information. Moreover, information to be transmitted is divided by information unit suitable for insertion into an information transmission packet, which is given to coding unit 23.

Coding unit 23 encodes information in the form of the above information unit, using the coding key, which is prepared in accordance with the category of supply information in coding key generator 24, thereby transmitting them to time-information generator 25.

Time-information generator 25 adds time information denoting present time or time information relating to the first packet, to the coded information in the form of an information unit, which is transmitted to information category generator 26. After that, information category generator 26 adds category information indicating the category of supply information, whereby information to be inserted into the information unit of an information transmission packet is completed and transmitted to server transmitter-receiver 27.

Next, server transmitter-receiver 27 inserts information to be transmitted provided by information category generator 26, into an information section of an information transmission packet, and adds a header section including information designating a broadcast communication, contract-type information label, and an information section identification label indicating that the content of the information section is supply information, thus transmitting the completed information transmission packet to network 3. Such information transmission packet is distributed to each user terminal 1-$i$ through broadcasting over network 3.

Next, the operation of user terminal 1-$i$ when receiving the information packet will be described, which is the feature operation of the first embodiment.

When a transmission packet reaches terminal transmitter-receiver 10, the contract-type information label therein is checked. Here, if the label indicates a contract information-type packet concerning the contracted information transmission service, whether it is further checked to determine whether it is an information transmission packet or a decoding key notification packet, is determined using the information section distinguishing label. If it is an information transmission packet, the content of the information section of the packet is provided to information category distinguishing unit 11. In addition, on the contrary, if the label does not indicate a contract information-type packet, terminal transmitter-receiver 10 forwards the packet to other units (not shown), which either perform respective processes or discard the packet.

Information category distinguishing unit 11 recognizes a server category, a genre category, and an information category disposed in the information section to compare them with the contract categories stored in category information storage 11$a$, which shows categories of supply information that the user terminal 1-$i$ is permitted to received. If identical, the content of the information section is transmitted to time-information distinguishing unit 12. If different, the information transmission packet is discarded.

Time-information distinguishing unit 12 recognizes time information from the content of the information section, and also compares the time information with that of the precedingly-supplied supply information stored in the information storage 16 in connection with the same category. If the time information denotes a proper order of supply information, the time information can permit the clock in the user terminal 1-$i$ to be correct. On the contrary, if the time information denotes a disorder of supply information, that is, denotes that information that should reach early failed to reach early, the information is discarded. In addition, a plurality of units of time information corresponds to a plurality of information transmission packets, if each has a respective one of the plurality of units of time information, and favors correcting a disorder thereof, if any disorder is found through checking of that time information.

Subsequently, the concrete content of the information section, namely, the transmission information body, is decoded using a decoding key corresponding to the category of the current supply information, thereby providing the decoded information to information processing unit 15. Information processing unit 15 stores in information storage 16 the decoded information from decoding unit 13 and time information from time-information distinguishing unit 12.

At the end of storing supply information, information input/output unit 17 notifies that updated supply information or newly-received supply information have been provided.

Finally, in response to a request for acquiring supply information from the user via information input/output unit 17, with a server category, a genre category, and information category being specified, information processing unit 15 extracts the supply information corresponding thereto, which includes time information, and thus provides it to the user via information input/output unit 17.

The effects of the information transmission system of the first embodiment are as follows.

(1) Once supply information is newly prepared, or supply information is updated, such information is distributed from server 2-$j$ to user terminal 1-$i$, whereby up-to-date information arrives at user terminal 1-$i$. This leads to efficient information transmission, since user terminals need not access the server frequently to confirm whether the received information is the newest or not.

(2) Only when new supply information is prepared, or when supply information is updated, the information is transmitted from server 2-$j$, which reduces transmission traffic as compared with the conventional repetitive transmission.

(3) Since an information transmission packet including a contract-type information label is transmitted and received, the user terminal can determine earlier whether or not an information transmission packet can be available therefor, thus avoiding useless receipt processes.

(4) User terminal 1-$i$ screens supply information using category information that is inserted in the information; hence, the user terminal 1-$i$ can discard unnecessary information with reference to predetermined categories indicative of useless information. In summary, the user terminal 1-$ii$ can receive only the latest and necessary information.

(5) Time information is transmitted and received between a server and user terminal; therefore, the user terminal can confirm the exact time as well as accurately recognize the time between transmission and receipt of the information.

(6) Time information is transmitted and received between a server and user terminal; accordingly, the user terminal can detect inverse arrival of old and new information, for example, due to a failure in the network. Moreover, the user terminal can discard the old received information, and check an order of a plurality of information transmission packets using the time information.

Second Embodiment

An information transmission system of the second embodiment according to the present invention will be detailed below with reference to drawings. Similarly to the information system of the first embodiment, the features of the information system of the second embodiment are broadcasting, transmitting category information, screening, etc. In addition to these features, this information transmission system transmits detailed category information.

The information transmission system, as shown in FIG. 2, is configured in such a way that several user terminals 1-1~1-$m$ and one or more servers (information storage supplying apparatus) 2-1~2-$n$ are connected to each other via network 3.

Figure 6:
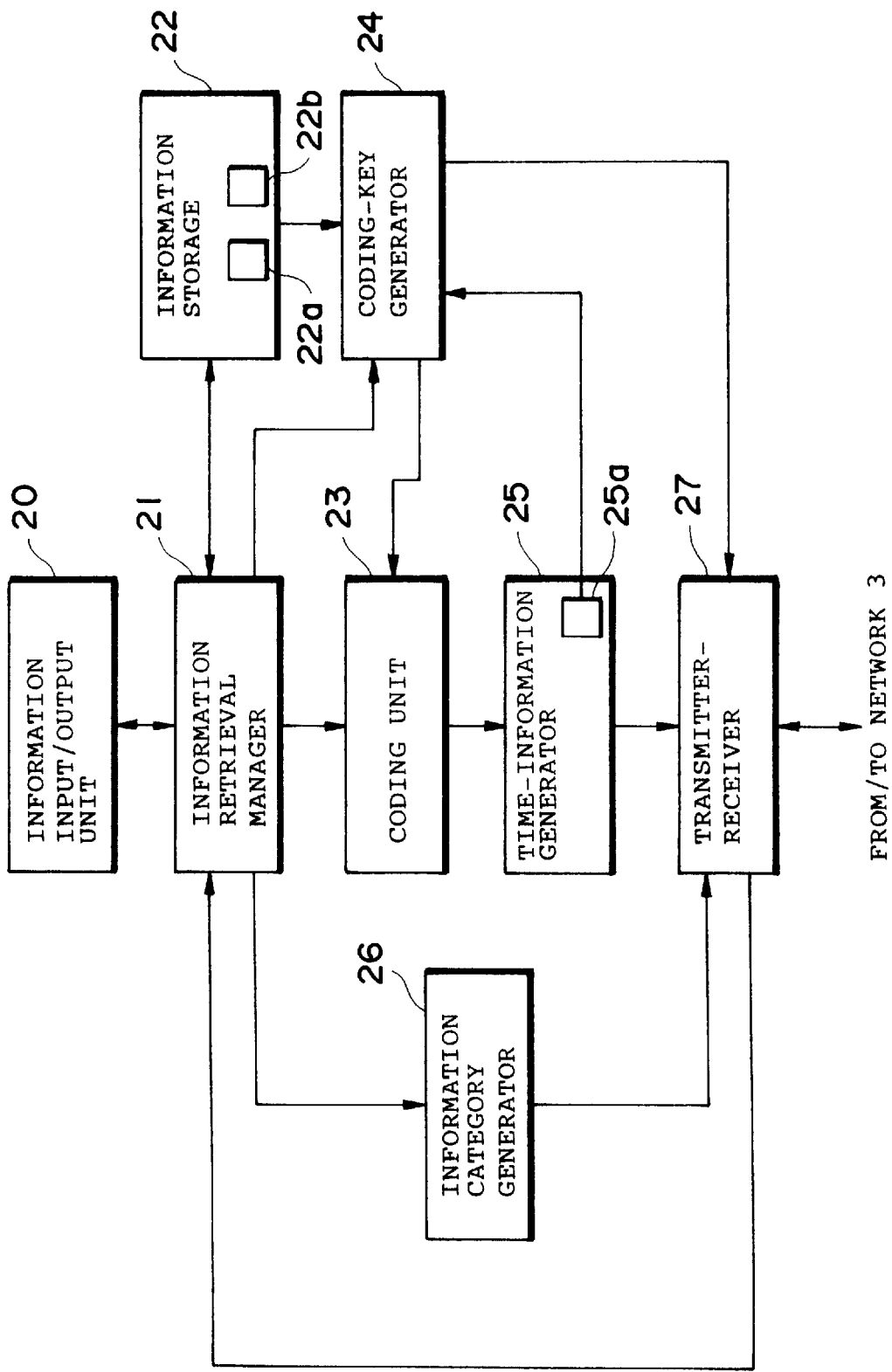
FIG. 6 is a functional block diagram showing the configuration of the server in the information transmission system of the second embodiment.

FIG. 6 shows the functional configuration of server 2-$j$. Here, the units similar to those in FIG. 1 are referred to using the same reference numerals.

Each server 2-$j$ is made up of information input/output unit 20, information retrieval manager 21, information storage 22, coding unit 23, coding key generator 24, time-information generator 25, information category generator 26, and server transmitter-receiver 27, which differ in some functions with respect to the system of the first embodiment. Hereinafter, the differences will be described in detail; on the contrary, the similar functions will not be described, for example, the functions of information input/output unit 20, information storage 22, coding unit 23 and time-information generator 25.

FIG. 7 shows a variety of packets used to make a communication between a server and a user terminal. More specifically, FIG. 7(a) shows a packet, which is transmitted from a server to a user terminal. FIG. 7(b) shows a transmission request packet, which is transmitted from a user terminal to a server. FIG. 7(c) shows a decoding key notification packet, which is transmitted from a server to a user terminal. FIG. 7(d) shows a decoding key receipt-answer packet, which is transmitted from a user terminal to a server. FIG. 7(e) shows an information transmission packet, which is transmitted from a server to a user terminal. Each of the packets will be detailed later.

Upon receipt of information on a contract-holder, which is indicative of making and canceling of the contract and changing the content of the contract, from information input/output unit 20, information retrieval manager 21 updates the content stored in contract-holder information storage unit 22b. When receiving new supply information and updated supply information from information input/output unit 20, information retrieval manager 21 updates the content stored in transmission target information storage 22a.

The above functions are similar to those in the first embodiment. However, the transmission function of transmitting supply information to a user terminal, is different from that in the first embodiment.

Information retrieval manager 21 activates information category generator 26 to generate and transmit only an information category by giving category information in connection with new supply information or updated supply information.

By activating transmission, the content of the information section of a packet broadcast through each user terminal 1-i is shown in FIG. 7(a). That is, a detailed category and a category identifier (hereinafter, referred to as "category ID") are included, as well as a server category, a genre category, and a information category, which are described in the first embodiment. The detailed category is, for example, a category categorized in more detail than the information category, and furthermore categorized in more detail than the minimal contract unit. That is, user terminal 1-j can check the necessity of new supply information or updated supply information, based upon the category more detailed than a minimal contract unit. In the second embodiment, a variety of packets are transmitted and received between server 2-j and user terminal 1-j. Herein, the category ID is inserted into the variety of packets, which enables specifying a category with a small number of bits.

When receiving a transmission request for new supply information or updated supply information from user terminal 1-i via server transmitter-receiver 27, information retrieval manager 21 confirms whether user terminal 1-i is permitted to receive the information corresponding to the information category, using the information stored in a contract-holder information storage 22b. Subsequently, information retrieval manger 21 commands coding key generator 24 to transmit to user terminal 1-i a coding key corresponding to the information category as a decoding key.

Here, the information section of a transmission request packet provided from user terminal 1-i includes a message commanding an information request and a category ID as shown in FIG. 7(b). Further, specific information of user terminal 1-i is obtained from transmission source information in the header section. As shown in FIG. 7(C), the decoding key notification packet includes a category ID as well as a coding key.

Upon receiving a receipt-answer of a decoding key from user terminal 1-i via server transmitter-receiver 27, information retrieval manager 21 updates charging information in contract-holder information storage unit 22b, and divides new supply information or updated supply information (which may be different pieces of the information in comparison with the preceding information) by several amounts suitable for the packets, and then provides them to coding unit 23.

In response to a request for transmitting the category information received from information retrieval manager 21, information category generator 26 generates category information, as shown in FIG. 7(a) to provide it to server transmitter-receiver 27.

Similarly to the first embodiment, coding key generation unit 24 repeatedly generates each category of a coding key at a predetermined period. Differently therefrom, however, the coding key (a decoding key) is not transmitted at the time of generation thereof; in response to a command from information retrieval manager 21, coding key generation unit 24 transmits the key to each user terminal specified by the command, which principally differs from the first embodiment.

Server transmitter-receiver 27 receives an information request packet and a decoding key receipt-answer packet, as well as transmits a category information packet, a coding key notification packet, and an information transmission packet, wherein only a category information packet is broadcast. In addition to referring to the content of the information section, each packet may be distinguished by referring to the information section distinguishing label in the header section (FIG. 3(a)). Furthermore, a contract-type information label is added to a packet transmitted from server 2-j, similarly to the first embodiment.

The information section of an information transmission packet comprises a category ID, time information, and a transmission information body, as shown in FIG. 7(e). Category information of updated supply information or new supply information has been transmitted using a category information packet in advance; accordingly, only a category ID is inserted when the amount of the transmission information body is increased.

Figure 8:
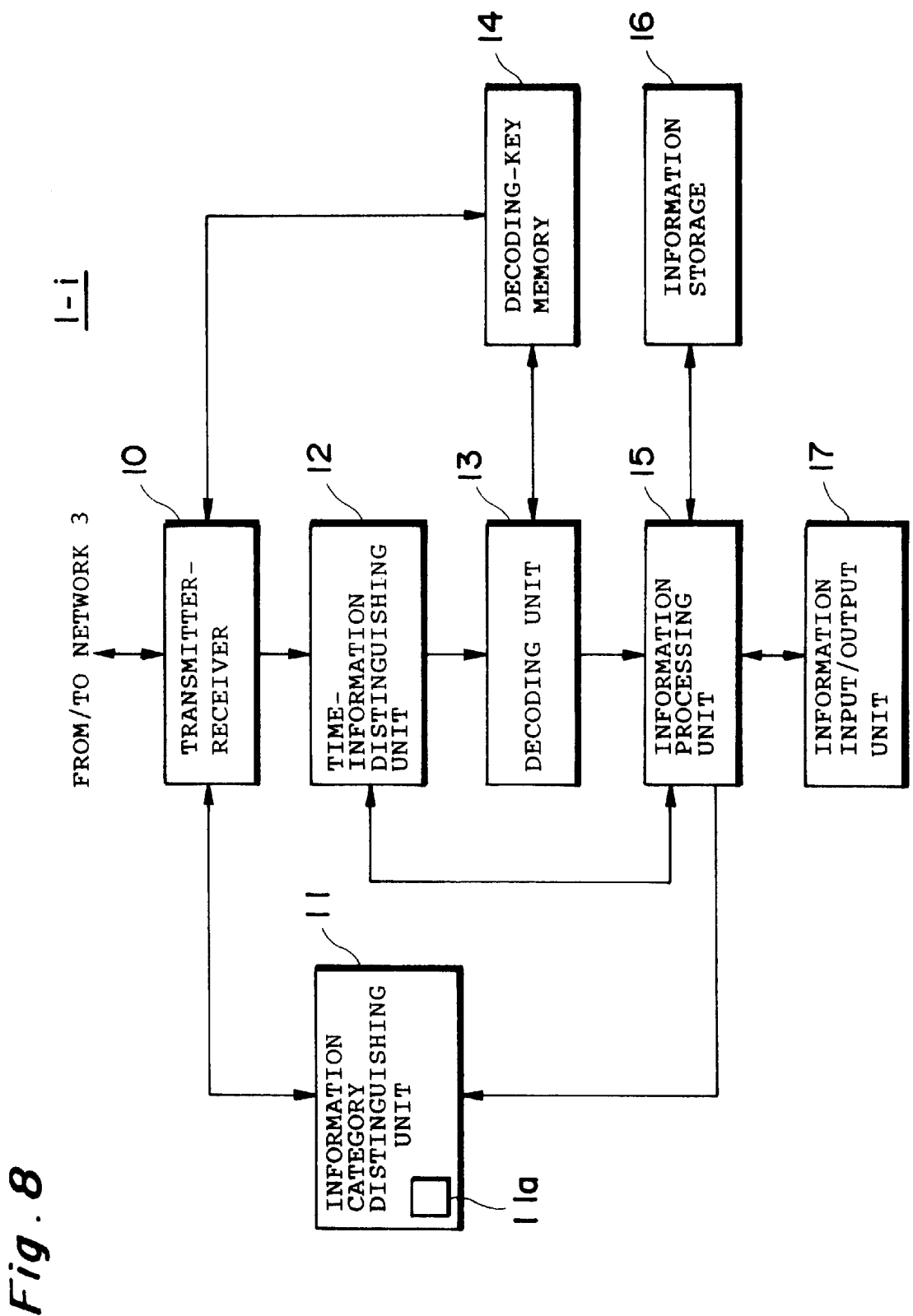
FIG. 8 is a functional block diagram showing the configuration of the user terminal in the information transmission system of the second embodiment.

FIG. 8 shows a functional configuration of user terminal 1-i. The same reference numerals are given to the same units as those in FIG. 4. Besides, some functions are similar to those in the first embodiment, for example, the functions of time-information distinguishing unit 12, decoding unit 13, decoding key memory 14, information processing unit 15, information storage 16, and information input/output unit 17, which will not be repetitively described.

Each user terminal 1-i, as shown in FIG. 8, comprises terminal transmitter-receiver 10, information category distinguishing unit 11, time-information distinguishing unit 12, decoding unit 13, decoding key memory 14, information processing unit 15, information storage 16, and information input/output unit 17.

Terminal transmitter-receiver 10 receives a category information packet, a decoding key notification packet, and an information transmission packet, and also transmits an information request packet and a decoding key receipt-answer packet.

When receiving the category information packet by confirming the possibility of receiving with the contract-type information label, the terminal transmitter-receiver 10 provides the category information packets (FIG. 7(a)) to information category distinguishing unit 11. Further, in response to a request for transmitting information from information category distinguishing unit 11, the terminal transmitter-receiver 10 transmits an information request packet, in which the content of the information section is shown in FIG. 7(b), to server 2-j, which is a transmission source of a category information packet.

Also, when receiving the decoding key notification packet by confirming the possibility of receiving using the contract-type information label, terminal transmitter-receiver 10 provides decoding key information (FIG. 7(c)) to decoding key memory 14. Further, in response to a notification of completion of storing from decoding key memory 14, the terminal transmitter-receiver 10 transmits a decoding key receipt-answer packet, in which the content of the information section is shown in FIG. 7(d), to server 2-j, which is a transmission source of a decoding key notification packet.

Furthermore, when receiving information transmission packet by confirming the possibility of receiving using the contract-type information label, terminal transmitter-receiver 10 provides the content of the packet information section (FIG. 7(e)) to time-information distinguishing unit 12.

Terminal transmitter-receiver 10 buffers the category ID inside upon transmission of an information packet, and also confirms whether it is concerned with a necessary category upon receipt of a decoding key notification packet or an information transmission packet, which enables simultaneous transmission/receipt to/from several servers.

Information category distinguishing unit 11 stores in the storage 11a, category information denoting supply information available for user terminal 1-i, which is entered by a user using information input/output unit 17. The category information may also denote a detailed category, which is the category smaller than the minimal contract unit, that is to say, denotes details of the category corresponding to the contract.

Upon receipt of category information from terminal transmitter-receiver 10, information category distinguishing unit 11 compares the category information to the content stored in storage 11, and if identical, commands terminal transmitter-receiver 10 to transmit an information transmission request packet.

Hereinafter, the operation of the information transmission system will be described with reference to FIG. 9, depicting an operation sequence. Here, since the transmission operation of a decoding key depends on other operations, the operation of transmitting supply information or updated supply information will be now described.

When new supply information or updated supply information is fed via information input/output unit 20, information retrieval manager 21 updates the content stored in transmission object information 22a according to the fed supply information, and by giving the category information corresponding to the fed supply information, requires information category generator 26 to prepare for transmission thereof.

At this time, information category generator 26 generates category information as shown in FIG. 7(a), thus providing it to server transmitter-receiver 27, wherein a header section is added to complete a category information packet, which is broadcast to all the user terminals via network 3 (T1 in FIG. 9).

User terminals that are not concerned with the contract of the received category information packet (shown as 1-b in FIG. 9), discard the category information packet in reference to the contract-type information label in the header section, thereby not preceding to any process (T2 in FIG. 9).

On the contrary, terminal transmitter-receiver 10 in a user terminal concerned with the contract recognizes the category information packet, and provides category information shown in FIG. 7(a), which is inserted in the information section, thus given to information category distinguishing unit 11. Hence, information category distinguishing unit 11 recognizes the category information, and determines whether or not it denotes a category of necessary supply information.

A user terminal (shown as 1-c in FIG. 9), upon determination of receiving a category information packet other than the category of necessary supply information, discards the received category information packet with no further process (T3 in FIG. 9).

On the other hand, information category distinguishing unit 11 in the user terminal (shown as 1-a in FIG. 9), upon determination of receiving a category information packet concerning the category of necessary supply information, requests to terminal transmitter-receiver 10 to transmit a transmission request packet. Then, terminal transmitter-receiver 10 transmits an information request packet of the content in the information section shown in FIG. 7(b), to server 2-j which has transmitted the category information packet (T4 in FIG. 9).

In response to the information request packet, server transmitter-receiver 27 in server 2-j notifies the receipt thereof to information retrieval manager 21, which commands coding key generation unit 24 to transmit a decoding key to user terminal 1-a of the transmission source after confirmation that it is a contract-holder.

Coding key generator 24 requests server transmitter-receiver 27 to transmit the decoding key corresponding to the information category, to the user terminal 1-a designated by information retrieval manager 21. Accordingly, server transmitter-receiver 27 transmits to user terminal 1-a, a decoding key notification packet, the content of which is shown in FIG. 7(C), is inserted in the information section (T5 in FIG. 9).

After confirming receipt permission in reference to a contract-type information label of the received packet, terminal transmitter-receiver 10 of user terminal 1-a recognizes a coding key notification packet, and then provides the content of the information section to decoding key memory 14, which stores the decoding key, wherein the decoding key is combined with the corresponding category. After the storage operation, terminal transmitter-receiver 10 is commanded to send a receipt-answer of the decoding key to server 2-j, thus sending back to server 2-j of a transmission source of the decoding key notification packet, a decoding key receipt-answer packet, the content of which is shown in FIG. 7(d) is inserted in the information section (T6 in FIG. 9). With such an answer-back operation, a contract is made again.

Upon notification that a receipt-answer of a decoding key is made, via server transmitter-receiver 27 from user terminal 1-a, information retrieval manager 21 updates charging information of the user terminal (contract-holder) 1-a in storage unit 22b, and also divides the current new supply information or the current updated supply information (which may be different pieces of information between the previous and the current) into several amounts each suitable for one packet, thus transmitting them to coding unit 23.

After this, no category information is generated; however, an information transmission packet, the content of which is shown in FIG. 7(e), is inserted in the information section, and is transmitted to user terminal 1-a by nearly the same process as that of the first embodiment (T7 in FIG. 9).

The receipt of an information transmission packet by user terminal 1-a is similar to that in the first embodiment, except for no distinguishing operation on information category, wherein information storage 16 stores the information transmitted thereto (transmission information body). Besides, the process of giving the stored supply information for a user is the same as that of the first embodiment.

In addition to the effects of the first embodiment, the second embodiment provides other effects as follows.

(1) Since only category information is transmitted, detailed information can be added thereto, which favors close or precise screening.

(2) User's sending of an information request makes a contract, which enables users to make only the contracts that are expected to supply necessary or favorite information.

Modification

Hereinafter, some modifications concerned with the above two embodiments will be described.

(1) The communication method is not limited to the above packet communication. Moreover, the packet communication may be performed on either a fixed length packet or a variable length packet basis. Further, a general communication approach like re-transmission is available.

(2) The encoding and decoding processes are not essential to the information transmission system, as long as network 3 is closed or private, not open or public. Moreover, the coding process may be common among categories of information to supply.

(3) Screening based upon only category information can work well in the system. Furthermore, screening based on a combination of category information and time information may be available; for example, the time necessary for a baseball result and horse racing odds are fixed, which allows a user terminal to process referring to the time disposed in category information, or allows the time-information distinguishing unit to screen.

(4) A server may also send to a user terminal contract-holder information, which can be set therein by the information category distinguishing unit.

(5) A user terminal may send a receipt-answer to the server at the end of receiving a series of supply information. In this case, updating of charging information is preferably carried out upon receiving of the receipt-answer.

(6) It is implicitly understood that methods of giving a user information that a user terminal has received and stored are not limited to those of the aforementioned embodiments.

(7) It is implicitly understood that the number of layers of categories of supply information is not limited to those in the aforementioned embodiments.

(8) Time information may be also inserted in a header section (a label section), which enables earlier checking of the order of packets. Similarly, category information can be inserted in the header section (a label section).

(9) Only transmission of ID is available to the information transmission system.

(10) An auxiliary server works well in the system: communication between the server and the auxiliary server can be available using the above method, and communication between the user terminal and auxiliary server can be available similarly.

(11) It is possible to check whether or not there is any new supply information or updated supply information at predetermined periods, and if any, to start a transmission operation. In short, one aspect of the present invention is the screening, not timing of transmitting information.

(12) the category information and the decoding key may be simultaneously transmitted, which is suitable for a closed network in terms of the confidentiality of a decoding key.

(13) In the system of the second embodiment, a decoding key is transmitted in response to a transmission request, which may be transmitted periodically as in the first embodiment.

As described above, according to an information transmission system, an information storing/supplying apparatus, and an information receipt apparatus of the present invention, by transmission/receipt of time information denoting a transmission time (not updating time) of the supply information, the information receipt apparatus can check whether or not the information is the latest, namely the newest, and whether or not the order of a plurality of information, namely packets, is correct. In addition, adjusting an internal clock using the time information enables the time over the information transmission system to be accurate.

Further, with the function of transmission/receipt of category information, it is possible to determine whether or not there is new supply information or updated supply information. Moreover, using the transmission/receipt information, the information receipt apparatus can also check whether or not there is new or updated supply information. Furthermore, since supply information is acquired through checking that it is necessity according to the category information necessary for the receipt apparatus, a variety of categories of frequently updated information can be obtained in real-time. Accordingly, the load on a network can be reduced.

What is claim is:

1. An information forwarding system for use with a network, the system comprising:

an information storing and providing apparatus for forwarding supply information; and a plurality of information receipt apparatuses for receiving the supply information;

wherein the information storing and providing apparatus comprises preparing means for preparing category information having indexes with respect to the contents of the supply information, and forwarding means for forwarding the supply information with the category information to the plurality of information receipt apparatuses, via the network; and wherein each of the plurality of information receipt apparatuses comprises receiving means for receiving the forwarded supply information and the category information, judging means for judging, for each of the plurality of information receipt apparatuses, whether the received supply information is necessary, based upon the category information, and presenting means for presenting the supply information judged to be necessary.

2. An information forwarding system for use with a network, the system comprising:

an information storing and providing apparatus for providing supply information; and a plurality of information receipt apparatuses for receiving the supply information;

wherein the information storing and providing apparatus comprises preparing means for preparing category information having indexes with respect to contents of the supply information, transferring means for transferring the category information to the plurality of receipt apparatuses, via the network, and forwarding means for forwarding the supply information to the plurality of receipt apparatuses; and wherein each of the plurality of information receipt apparatuses comprises receiving means for receiving the forwarded supply information and the transferred category information, judging means for judging, for each of the plurality of information receipt apparatuses, whether the received supply information is required, upon the received category information, replying means for replying a result of the judging means to the information storing and providing apparatus, and presenting means for presenting the supply information;

wherein the forwarding means forwards the supply information only to the information receipt apparatuses that require the supply information, based on the result of the judging means.

3. An information forwarding system as set forth in claim 2, wherein the information storing and providing apparatus further comprises charging means for associating a charge for each of the plurality of information receipt apparatuses corresponding to a fee for each unit of the supply information that each of the plurality of information receiving apparatuses presents.

4. An information forwarding system as set forth in claim 2, wherein the forwarding means broadcasts the supply information in response to the judging result reply from the plurality of information receipt apparatuses.

5. An information forwarding system as set forth in claim 2, wherein the forwarding means multicasts the supply information in response to the judging result reply from the plurality of information receipt apparatuses.

6. An information forwarding system as set forth in claim 2, wherein the indexes of the category information form a hierarchical structure, and the judging means judges based on the category information in an order from upper indexes of the hierarchical structure to lower indexes of the hierarchical structure.

7. An information forwarding system as set forth in claim 2, wherein the information storing and providing apparatus further comprises coding means for encrypting the supply information, and generating means for generating a decryption key for decrypting the encrypted supply information, and wherein the forwarding means forwards the encrypted supply information and the decryption key.

8. An information forwarding system for use with a network the system comprising:

an information storing and providing apparatus for providing supply information; and a plurality of information receipt apparatuses for receiving the supply information;

wherein the information storing and providing apparatus comprises preparing means for preparing category information having indexes with respect to contents of the supply information, updating means for updating the supply information, adding means for adding to the supply information, time information relating to updating the supply information, and forwarding means for forwarding the category information and the supply information to the plurality of information receipt apparatuses; and wherein each of the plurality of information receipt apparatuses comprises receiving means for receiving the category information and the supply information, judging means for judging which of the received supply information is most recent, based upon the corresponding time information, and presenting means for presenting the most recent supply information.

9. An information forwarding system for use with a network, the system comprising:

an information storing and providing apparatus for providing supply information; and a plurality of information receipt apparatuses for receiving the supply information;

wherein the information storing and providing apparatus comprises preparing means for preparing category information having indexes with respect to contents of the supply information, updating means for updating the supply information, adding means for adding to the supply information, time information relating to updating the supply information, and forwarding means for forwarding the category information and the supply information to the plurality of information receipt apparatuses; and wherein each of the plurality of information receipt apparatuses comprises receiving means for receiving the category information and the supply information, judging means for judging which of the received supply information is most recent, based upon the corresponding time information, rearranging means for rearranging the received supply information with reference to the corresponding time information, and presenting means for presenting the rearranged supply information.

10. An information forwarding system as set forth in claim 1, wherein the forwarding means broadcasts the supply information.

11. An information forwarding system as set forth in claim 9, wherein the information storing and providing apparatus further comprises storage means for storing supply information forwarded to the plurality of information receipt apparatuses, as previously-forwarded supply information; and the updating means comprises means for providing supply information that is more recent than the previously-forwarded supply information, as updated supply information, difference means for determining a difference between the updated supply information and the previously-forwarded supply information, and for providing a difference result, compare means for comparing the difference result with a threshold, and for providing a comparison result, and selection means for selecting one of the updated supply information and the difference result, to be provided to the adding means as the supply information, wherein the selection means selects the updated supply information if the comparison result indicates that the difference result is larger than the threshold; and wherein the selection means selects the difference result if the comparison result indicates that the difference result is smaller than the threshold.

12. An information forwarding system as set forth in claim 1, wherein the supply information is a contract-type information packet having a label including contract-type information; and the judging means judges whether the received supply information is a contract-type information packet by examining the label for contract-type information.

\* \* \* \* \*